(Model.)
I. F. ALGER.
Horse Hitcher.
No. 233,654. Patented Oct. 26, 1880.
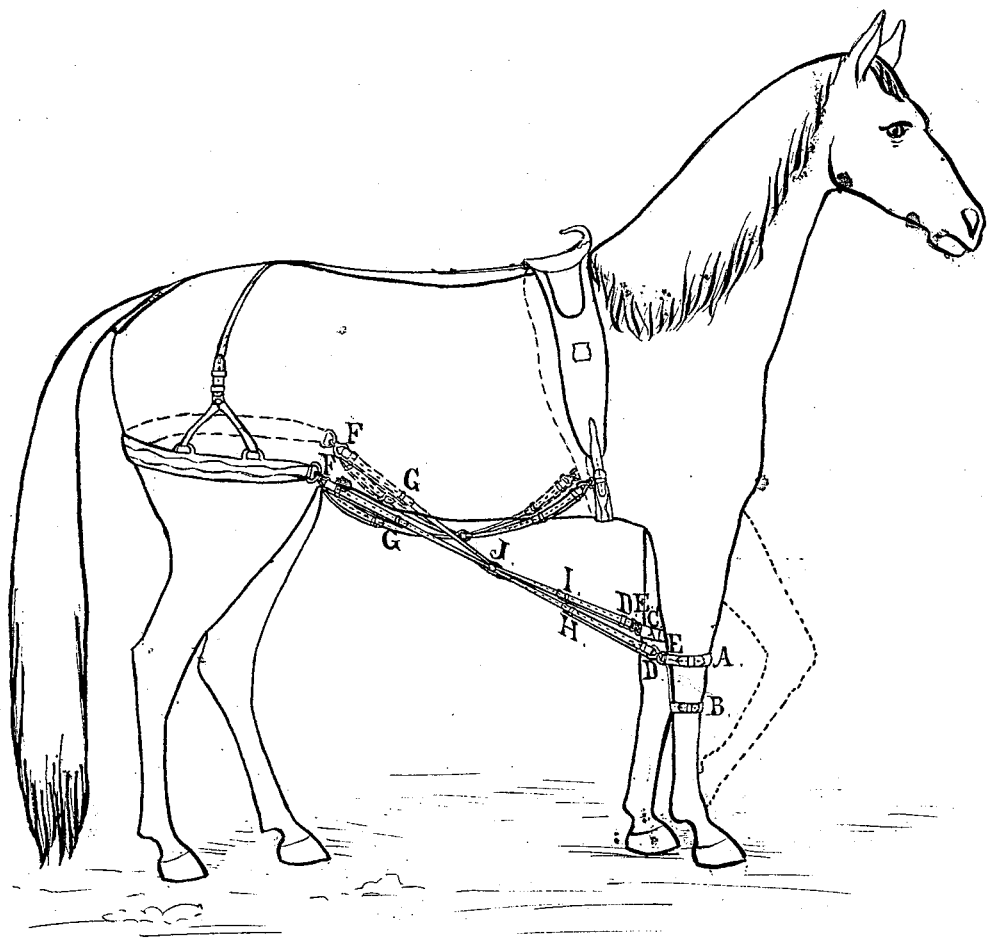
Witnesses.
David H. Merriam
Wylon G. Hayes.
Israel F. Alger
Inventor.

United States Patent Office.

ISRAEL F. ALGER, OF FITCHBURG, MASSACHUSETTS.

HORSE-HITCHER.

SPECIFICATION forming part of Letters Patent No. 233,654, dated October 26, 1880.

Application filed August 9, 1880. (Model.)

*To all whom it may concern:*

Be it known that I, ISRAEL F. ALGER, a citizen of the United States, residing at Fitchburg, in the county of Worcester and State of Massachusetts, have invented a new and useful Horse-Hitcher; and I do hereby declare the following to be a full, clear, and exact description of the invention, reference being had to the accompanying drawing and letters of reference marked thereon.

The nature of my invention consists in a combination of straps attached to a common harness, so as to hitch a horse or other animal without the use of hitching-post or weight.

The drawing represents a perspective view of my invention applied to a horse, with letters of reference thereon.

A represents a strap which passes around the horse's leg close above the knee. B represents a strap which passes around the horse's leg just below the knee, the straps A and B being connected by two small straps. The purpose of strap B as connected with strap A is to prevent strap A from rising up on the leg of the horse or other animal when hitched.

C represents a single strap, which clasps the horse's leg close above the knee for the same purpose of straps A and B.

D D represent snaps attached to straps H and I, which snaps hitch into rings E E on strap A, or strap C when C is used instead of straps A and B.

F F represent snaps attached to straps G G, which snaps hitch into the breeching-rings of harness on both sides at or near flank of horse.

G G represent straps connected with snaps F F and ring J.

H represents a strap connected with ring J and snap D, which snap hitches into ring E on strap A, and when strap C is used instead of straps A and B strap H hitches into ring E on strap C.

I represents a movable strap connected with ring J and snap D, which snaps into ring E on strap A or C, which strap I is not used except when both legs are hitched.

J represents a ring connecting straps G G and H and I.

When snaps D D are unhitched from rings E E on straps A and C they may be hitched one on each side to the buckle on the girth of the harness, or to rings applied to the harness for that purpose. Thus the hitching-strap may remain while driving with no inconvenience.

By means of the application of the above invention to the horse he is prevented from making any forward motion of the knee, without which forward motion he cannot go either forward or backward, and is under the complete control of the hitcher and very readily succumbs to the necessity of standing without any trouble or injury to the horse.

I claim as new and desire to secure by Letters Patent—

The straps A, B, and C, in combination with straps G G and H I, the ring J, the snaps D D and F F, and the breeching of a harness, substantially as described.

ISRAEL F. ALGER.

Witnesses:
DAVID H. MERRIAM,
WYLON G. HAYES.